May 5, 1959
P. R. PITTMAN, JR
2,884,815
ROTARY SPEED CHANGER
Filed Feb. 23, 1956
2 Sheets-Sheet 1
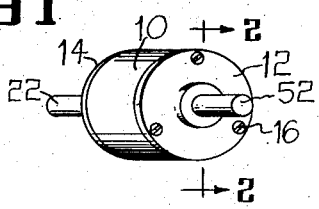
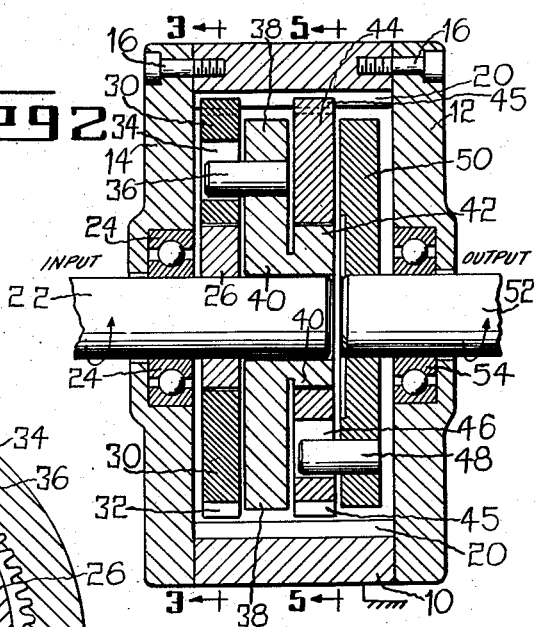
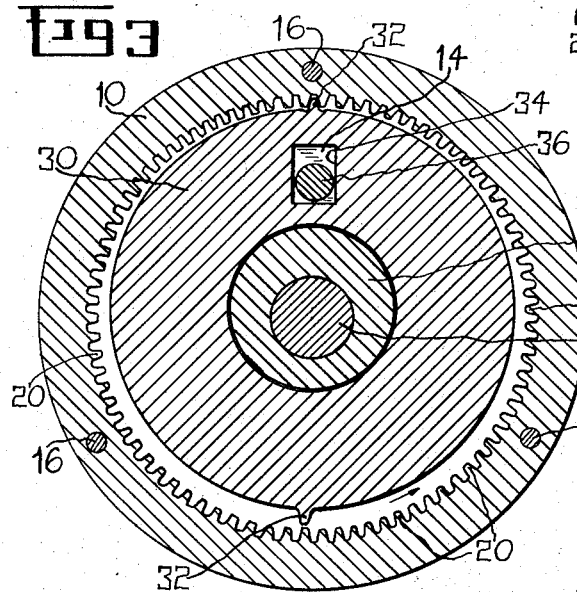
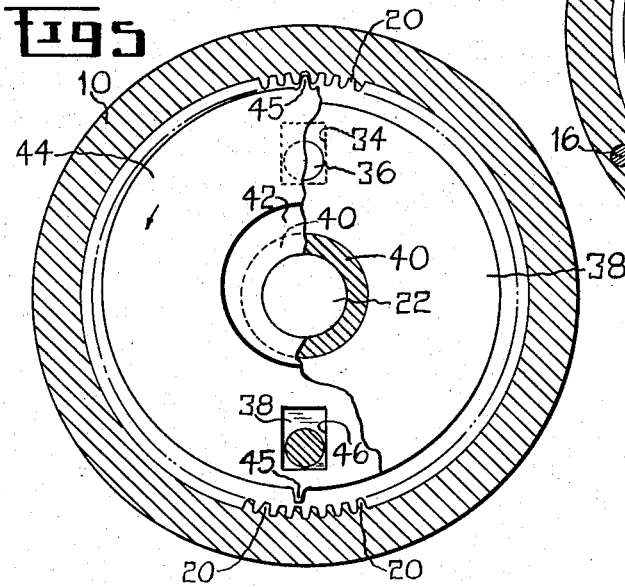
INVENTOR.
PAUL R. PITTMAN, JR.
BY
Dybvig & Jacox
HIS ATTORNEYS

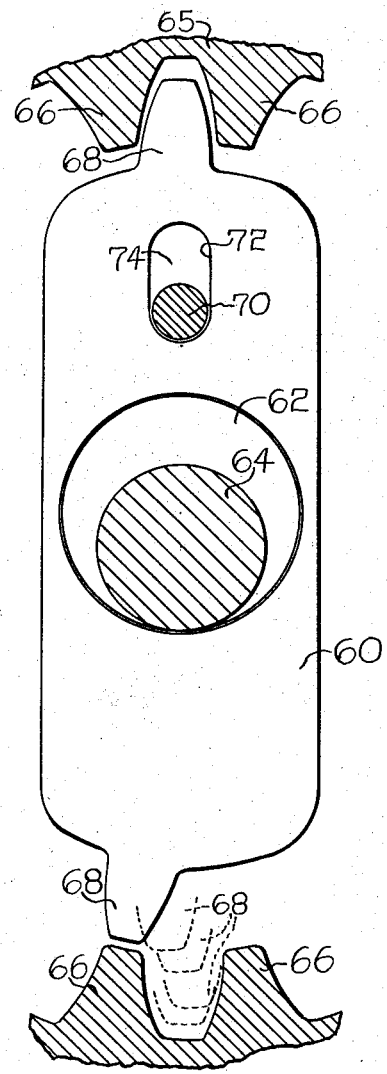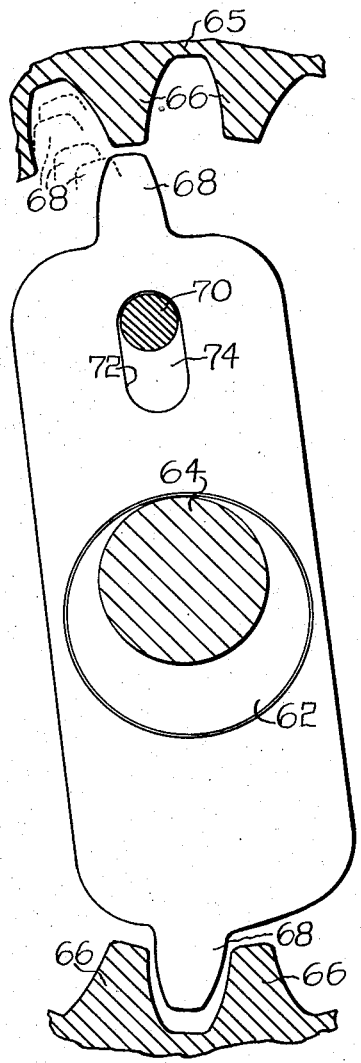

United States Patent Office 2,884,815
Patented May 5, 1959

2,884,815
ROTARY SPEED CHANGER

Paul R. Pittman, Jr., Dayton, Ohio, assignor to Globe Industries, Inc., Dayton, Ohio, a corporation of Ohio Application February 23, 1956, Serial No. 567,128

4 Claims. (Cl. 74—804)

This invention relates to a rotary speed changer. The invention relates to a speed changer of the gear assembly type.

An object of this invention is to provide a rotary speed changer in which the ratio of the input rotational speed to the output rotational speed is very high in consideration of the physical size of the unit.

Another object of this invention is to provide a rotary speed changer which may be built in a comparatively small compact physical size in consideration of the amount of power which the assembly is capable of transmitting.

Another object of this invention is to provide a rotational speed changer in which the number of stages of speed reduction can be easily increased by merely increasing the axial length of the assembly.

Another object of this invention is to provide a rotary speed changer having a minimum number of moving parts.

Other objects and advantages reside in the construction of parts, the combination thereof and the mode of operation, as will become more apparent from the following description.

In the drawing:

Figure 1 is a perspective view of a rotary speed changer of this invention.

Figure 2 is an enlarged side sectional view of a rotary speed changer of this invention.

Figure 3 is a sectional view taken substantially on line 3—3 of Figure 2.

Figure 4 is a sectional view similar to that of Figure 3 but with parts broken away. Figure 4 shows the movable elements of the invention in positions thereof different from the positions shown in Figure 3.

Figure 5 is a sectional view, with parts broken away, taken substantially on line 5—5 of Figure 2.

Figure 6 is an enlarged fragmentary view of a modification of the rotational speed changer of this invention.

Figure 7 is an enlarged fragmentary view similar to that of Figure 6 showing the movable elements of the invention in positions different from the positions shown in Figure 6.

The rotational speed changer of this invention comprises a hollow cylindrical housing or annular gear 10 which is provided with an end plate 12 at one end thereof and an end plate 14 at the other end thereof. The end plates 12 and 14 are attached to the cylindrical housing 10 by any suitable means such as by screws or bolts 16.

The cylindrical housing or annular gear 10 is provided with a plurality of radial teeth 20 which extend axially within the annular gear 10.

An input shaft 22 is rotatably supported by an anti-friction bearing 24 mounted within the end plate 12. The input shaft 22 extends within the housing or annular gear 10 and is substantially concentric therewith.

The input shaft 22 may be rotatively driven by any suitable means. Firmly attached to the input shaft 22 within the housing 10 and rotatable therewith is an eccentric member in the form of a circular disc or cam 26. Rotatably carried within the annular gear 10 by the cam 26 is a follower member 30. The follower member 30 is provided with a plurality of teeth or projections 32. Preferably, the teeth 32 are disposed at opposite portions of the follower 30. Herein, the number of teeth of the follower is shown as being two in number; however, a greater number of teeth may be provided.

The teeth 32 are adapted to mesh with the teeth 20 of the cylindrical housing 10. However, as the cam member 26 rotates with rotation of the shaft 22, the cam member 26 moves the follower member 30 in a reciprocal manner so that each of the teeth 32, as shown in Figures 3 and 4, alternately engage the teeth 20 of the housing 10. During each engagement of one of the teeth 32 with the teeth 20 of the housing 10, as the cam 26 rotates, the cam 26 moves the follower 30 slightly in a direction normal to the teeth 32. Thus, there is pivotal movement of the follower 30 about each tooth 32 which is in engagement with the teeth 20. This pivotal movement of the follower 30 with rotation of the cam 26 results in slight rotational movement of the follower 30 so that each tooth 32 of the follower 30 moves from one tooth 20 of the housing 10 to an adjacent tooth 20 of the housing 10, with each revolution of the cam member 26. Therefore, the input shaft 22 must rotate through a number of revolutions equal to the number of teeth 20 in the annular gear 10 in order to cause one revolution of a follower 30. Thus, a first stage of rotational speed reduction is provided.

In order to transmit the rotational movement of the follower 30 to another rotatable element, any suitable means may be provided. Herein shown, a radial slot 34 is formed in the follower member 30. The slot 34 is adapted to receive an axially extending pin member 36. The pin member 36 is attached to an intermediate member 38 which is herein shown in the form of a wheel, but may be in the form of an arm or any other suitable shape. The intermediate member 38 may be attached to a suitable output shaft when only one stage of rotational speed reduction is desired. However, herein, a two-stage reduction unit is shown.

The intermediate member 38 is integrally attached to a hub member 40, which is rotatably carried by the input shaft 22. Integrally attached to the hub 40 in axial alignment with the intermediate member 38, a cam member 42 which is similar to the cam member 26. Rotatable about the cam 42 is a second follower member 44, shown in Figures 2 and 5.

The follower member 44 is similar to the follower 30 and is provided with a plurality of teeth or projection members 45 disposed at opposite portions thereof. Rotation of the cam member 42 causes reciprocal and rotational movement of the follower 42 in a manner similar to that described with respect to the follower 30. The follower 44 rotates the distance from one of the teeth 20 of the cylindrical housing 10 to an adjacent tooth 20 upon each revolution of the cam 42.

The follower 44 is provided with a radially extending slot 46 into which an axially extending pin member 48 is slidably movable. The pin member 48 is rigidly attached to a connector member in the form of an arm or wheel 50. The arm or wheel 50 is firmly attached to an output shaft 52 which is rotatably supported in the end plate 12 by means of an anti-friction bearing 54. Therefore, the output shaft 52 is driven by the input shaft 22 through two stages of speed reduction.

In Figures 1, 2, 3, 4 and 5, as shown, the ratio of rotational speed between the input shaft and the output shaft is equal to one divided by the square of the number of the teeth 20 in the cylindrical housing.

It is to be understood that by changing the amount of eccentricity of the cam members 26 and/or 42, the amount of rotational movement of the followers 30 and/or 44 with each revolution of the cams may be changed. In other words, by changing the amount of eccentricity of the cams, the followers may be caused to move more than one tooth during each revolution of the respective cam members.

Figures 6 and 7 show in enlarged detail a modification of this invention. These figures clearly show the reciprocal and rotational movement of a follower member 60 which is driven by means of a cam member 62. The cam member 62 is rigidly attached to a shaft 64. The follower member 60 rotates within a housing or annular gear 65, provided with internal radial teeth 66.

The follower member 60 is provided with teeth 68, which are positioned at opposite portions thereof and which are adapted to mesh with the teeth 66.

A pin member 70, slidably movable within a radial slot 72 of the follower 60 is adapted to be attached to any suitable rotational member 74 for rotation thereof with the follower member 60.

Figures 6 and 7 show in detail, by means of dotted lines, the movement of the follower member 60 during movement thereof from one tooth 66 to another tooth 66 during one complete revolution of the cam member 62.

Thus, it is to be understood that the rotational speed changer of this invention provides means by which a high ratio of rotational speeds between an input shaft and an output shaft may be obtained with an assembly of small physical size.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A rotary speed changer apparatus comprising a first shaft, a fixedly mounted circular stop member surrounding a portion of said shaft provided with an internal circular gear having its teeth extending inwardly, a follower member eccentrically mounted upon said shaft and within said stop member, the major portion of the periphery of said follower member being toothless and minor portions thereof in opposed position on the peripheral surface thereof being each formed with at least one tooth, the distance between opposed teeth on said follower member being slightly greater than the internal diameter of said stop member, whereby the teeth of said follower member are thus adapted to mesh with the teeth of the internal gear in alternating fashion with first one tooth on one of said minor portions of said follower member meshing with the internal gear teeth followed by a tooth on the opposed minor portion meshing with the internal gear teeth so that said follower member rotates in smooth continuous fashion, a second shaft, a driven member drivingly coupled with said second shaft, and lost motion coupling means interconnecting said follower member with said driven member and permitting said driven member to continuously rotate at a speed slower than the speed of said first shaft, the maximum obtainable speed ratio between said two shafts being thus equal to the reciprocal of the number of teeth of said internal gear.

2. A rotary speed changer apparatus comprising a first shaft, a fixedly mounted internal ring gear surrounding a portion of said shaft and concentric therewith, an elongate follower bar eccentrically mounted upon said first shaft and within said gear, the major portion of the periphery of said follower bar being toothless and minor portions in opposed position on the peripheral surface thereof being each formed with at least one tooth, the outer diameter of said follower bar being slightly larger than the internal diameter of said gear, whereby the teeth of said bar are thus adapted to mesh with the teeth of the gear in alternating fashion with first one tooth on one of said minor portions of said bar meshing with the ring gear followed by a tooth on the opposed minor portion meshing with the internal gear teeth so that said bar rotates in smooth continuous fashion, a second shaft, a driven member drivingly coupled with said second shaft, and lost motion coupling means interconnecting said bar with said driven member and permitting said driven member to continuously rotate at a speed slower than the speed of said first shaft, the maximum obtainable speed ratio between said two shafts being thus equal to the reciprocal of the number of teeth of said internal gear.

3. A speed reducer comprising a fixedly mounted hollow cylindrical housing having internal radial longitudinally extending teeth, a drive shaft within the housing concentric therewith, a cam attached to the drive shaft and rotatable therewith and having a surface eccentric therewith, a follower mounted on the eccentric surface and rotatable by the cam, the follower having teeth radiating therefrom only at opposite portions thereof, the teeth being adapted to mesh with the teeth of the housing as the follower is reciprocably rotated by the cam, a hub rotatably mounted about but out of contact with the drive shaft, lost motion means interconnecting the hub with the follower for rotation therewith, an output shaft, means for drivingly interconnecting said hub with said output shaft.

4. The speed reducer of claim 3 wherein the follower has only one tooth at each of said opposed portions.

References Cited in the file of this patent

UNITED STATES PATENTS

| | | |
|---|---|---|
| 2,170,951 | Perry | Aug. 29, 1939 |
| 2,303,365 | Karlsen | Dec. 1, 1942 |
| 2,356,914 | Blancha | Aug. 29, 1944 |
| 2,520,282 | Henry | Aug. 29, 1950 |

FOREIGN PATENTS

| | | |
|---|---|---|
| 500,233 | Great Britain | Feb. 6, 1939 |
| 677,052 | Germany | June 17, 1939 |
| 588,423 | Great Britain | May 21, 1947 |